United States Patent [19]

Chana et al.

[11] 3,717,131
[45] Feb. 20, 1973

[54] INTAKE MANIFOLD FOR EXHAUST GAS RECIRCULATION

[75] Inventors: Howard E. Chana; Joseph Rado, both of Flint; Harold D. White, Fenton, all of Mich.

[73] Assignee: General Motors Corporation, Detroit, Mich.

[22] Filed: Nov. 10, 1971

[21] Appl. No.: 197,299

[52] U.S. Cl. ....123/52 MV, 123/119 A, 123/122 AB
[51] Int. Cl. ..............................................F02m 25/06
[58] Field of Search..............123/119 A, 52 MV, 122

[56] References Cited

UNITED STATES PATENTS 3,237,615   3/1966   Daigh...............................123/119 A
3,646,923   3/1972   Sarto................................123/119 A
2,287,593   6/1942   Ball..................................123/119 A
2,713,857   6/1955   Keydel............................123/122 A Primary Examiner—Al Lawrence Smith
Assistant Examiner—Dennis Toth
Attorney—J. L. Carpenter et al.

[57] ABSTRACT

In an internal combustion engine, exhaust gas is recirculated from the intake manifold exhaust gas crossover passage to the induction passages. The exhaust gas recirculation passage is cast integrally in the intake manifold structure, extending from the exhaust crossover passage to a recirculation control valve and then to the induction passages below the primary riser passages. The exhaust gas crossover passage circumvents the recirculation passage in the region below the primary risers.

3 Claims, 4 Drawing Figures

PATENTED FEB 20 1973　　3,717,131

INVENTORS
Howard E. Chana,
BY Joseph Rado &
Harold D. White
C. K. Veenstra
ATTORNEY

INTAKE MANIFOLD FOR EXHAUST GAS RECIRCULATION

This invention provides an intake manifold having induction, exhaust gas crossover, and exhaust gas recirculation passages cast in an integral unit. The exhaust gas flowing through the crossover passage appropriately heats the induction passages, and exhaust gas drawn from the crossover passage through the recirculation passage is metered by a control valve and properly introduced into the induction passages.

The details as well as other objects and advantages of this invention are set forth below and shown by the drawings wherein.

Figure 1:
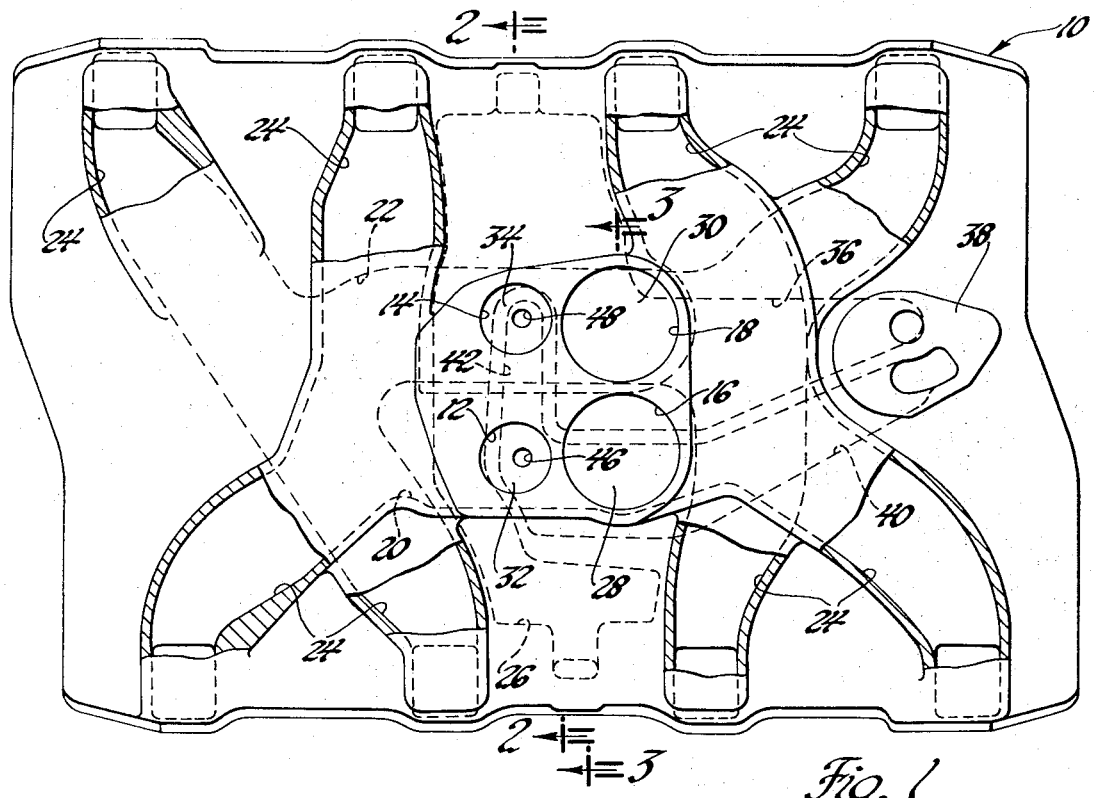
FIG. 1 is a top plan view of an intake manifold having an integrally cast exhaust gas recirculation passage.
Figure 2:
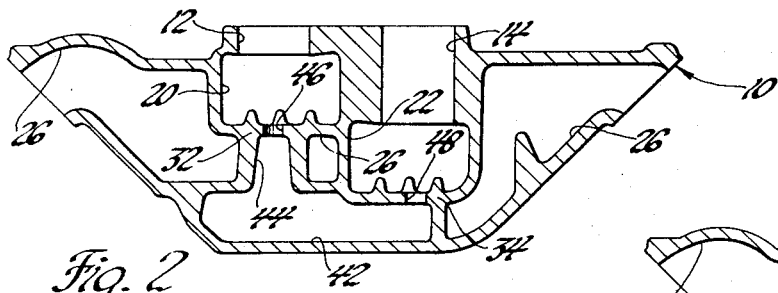
FIG. 2 is a sectional view taken along line 2—2 of FIG. 1 illustrating the openings from the exhaust gas recirculation passage to the induction passages.
Figure 3:
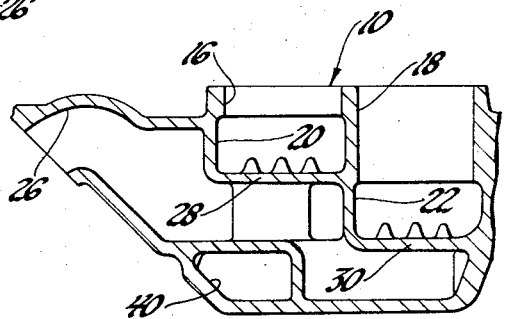
FIG. 3 is a sectional view along line 3—3 of FIG. 1 showing the location of the exhaust gas crossover passage and the recirculated exhaust gas passage.

Referring first to FIGS. 1-3, a manifold 10 has a pair of primary riser passages 12 and 14 and a pair of secondary riser passages 16 and 18. Riser passages 12 and 16 connect with an upper plenum chamber 20 and riser passages 14 and 18 connect with a lower plenum chamber 22, plenum chambers 20 and 22 being generally horizontal and extending longitudinally through the manifold to transversely reaching runner passages 24. An exhaust gas crossover passage 26 extends transversely under and in heat exchange relationship with plenum chambers 20 and 22 in the regions 28 and 30 thereof directly below secondary riser passages 16 and 18. Exhaust gas crossover passage 26 also extends transversely under and in heat exchange relationship with the forward portions of plenum chambers 20 and 22, but circumvents the regions 32 and 34 thereof directly below primary riser passages 12 and 14.

Figure 4:
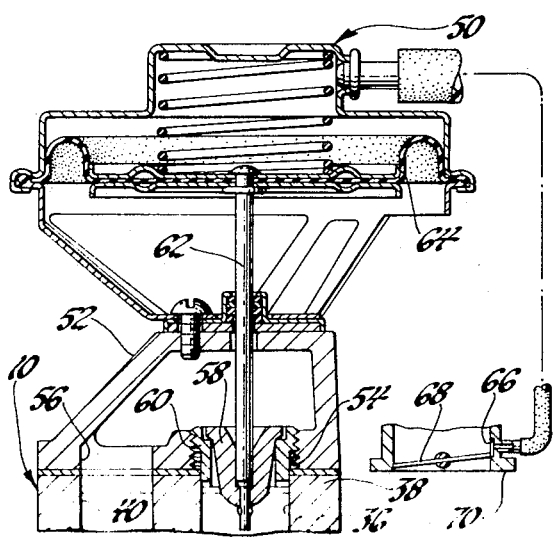
FIG. 4 is an enlarged sectional view in elevation of an exhaust gas recirculation control valve assembly.

An exhaust gas recirculation passage 36 leads from exhaust gas crossover passage 26 to a pad 38 which is adapted to receive a control valve assembly such as that shown in FIG. 4. Alternatively, an exhaust gas recirculation control valve assembly of different design could be mounted on pad 38 or otherwise received in a pocket in manifold 10. A metered exhaust gas passage 40 extends from pad 38, under exhaust gas crossover passage 26 to a portion 42 extending transversely beneath regions 32 and 34 of plenum chambers 20 and 22. Portion 42 includes an upwardly extending well 44 having a port 46 opening into upper plenum chamber 20 directly beneath primary riser 12 and a second port 48 opening into lower plenum chamber 22 directly beneath primary riser 14.

In operation, a fuel injection throttle body or a carburetor (not shown) mounted on manifold 10 in registration with riser passages 12, 14, 16 and 18 supplies air or an air-fuel mixture to the manifold induction passages comprised of risers 12, 14, 16, and 18, plenums 20 and 22, and runners 24. The air or air-fuel mixture passing through the induction passage is heated by exhaust gas flowing through crossover 26. And exhaust gas is recirculated from crossover 26, through 36, 40, 42, 44, 46, and 48 to the induction passages.

It will be appreciated that this design permits recirculation of hot exhaust gases through short passages having large flow areas in a manner which minimizes the possibility of exhaust gas deposit formation. Further, the recirculated exhaust gas is injected into the induction system at a location which provides optimum mixing with the air-fuel charge entering from the riser passages. In addition, and perhaps most importantly, the induction passage heating attributes of the exhaust gas crossover system and the recirculation of exhaust gases are combined to maximize the benefits available from each. In this last respect, it should be noted that the transversely extending portion 42 of the metered exhaust passage 40 is surrounded by the exhaust gas crossover passage 26 in order that the regions 32 and 34 of plenums 20 and 22 may be heated by crossover exhaust gas flow without losing the benefits available from injecting recirculated exhaust gas at the locations of ports 46 and 48.

FIG. 4 shows one embodiment of an exhaust gas recirculation control valve assembly 50 which may be mounted on pad 38 of manifold 10. It comprises a valve body 52 adapted to be received on pad 38. Valve body 52 has an inlet 54 which registers with exhaust gas recirculation passage 36 and a metered exhaust outlet 56 which registers with metered exhaust passage 40. A valve pintle 58 controls flow through a valve seat 60 adjustably mounted in inlet 54. Pintle 58 is positioned by a stem 62 operated by a diaphragm 64 which is responsive to the vacuum signal created at a port 66. Port 66 is disposed in the throttle body 70 adjacent the throttle 68 controlling the air-fuel charge entering one of the primary riser passages 12 or 14.

We claim:

1. A bi-level intake manifold for supplying air and exhaust gas to a V-8 type internal combustion engine having combustion chambers disposed along opposite sides of a longitudinal center line, said manifold comprising a casting having a pair of generally vertical primary riser passages transversely spaced on opposite sides of said center line, a pair of generally vertical secondary riser passages transversely spaced on opposite sides of said center line, an upper generally horizontal plenum chamber extending longitudinally from the bottom of one of said primary and one of said secondary riser passages, a lower generally horizontal plenum chamber extending longitudinally from the bottom of the other of said primary and the other of said secondary riser passages and extending beneath said upper plenum chamber at the ends thereof, runner passages extending transversely from the ends of said plenum chambers, an exhaust gas crossover passage extending transversely under and in heat exchange relation with the surface of said plenum chambers below said secondary riser passages and circumventing a portion of a metered exhaust gas recirculation passage formed in said plenum chambers at the surfaces below said primary riser passages, an exhaust gas recirculation passage extending from said exhaust gas crossover passage to means for receiving an exhaust gas recirculation control valve adapted to meter the flow of exhaust gas through said exhaust gas recirculation passage, metered exhaust gas recirculation passage extending from said valve receiving means to said portion extending transversely under said plenum chambers, said portion including a first port opening generally vertically into said upper plenum chamber in said region below said one primary riser passage and a second port opening generally vertically into said lower plenum chamber in sad region below said other primary riser passage whereby metered exhaust gas may be delivered through said plenum chambers and said runner passages to said engine.

2. The intake manifold of claim 1 wherein said metered exhaust passage extends under said exhaust gas crossover passage.

3. The intake manifold of claim 2 wherein said metered exhaust passage extends under that portion of said exhaust gas crossover passage which extends transversely under and in heat exchange relationship with the region of said plenum chambers below said secondary riser passages and wherein said transversely extending portion of said metered exhaust passage is disposed below the region of said plenum chambers below said primary riser passages and is surrounded by that portion of said exhaust crossover passage which circumvents the region of said plenum chambers below said primary riser passages.

* * * * *